Figure 1:
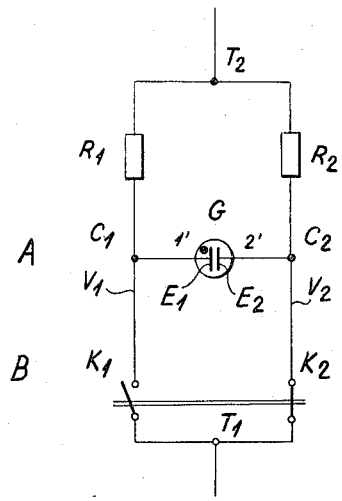

May 14, 1968     F. PÁLOS ETAL     3,383,671
SWITCHING SYSTEM INDICATING APPARATUS
Filed Sept. 30, 1964     2 Sheets-Sheet 1

INVENTORS:
Ferenc Pálos
János Elsner

United States Patent Office 3,383,671
Patented May 14, 1968

3,383,671
SWITCHING SYSTEM INDICATING APPARATUS
Ferenc Pálos and János Elsner, Budapest, Hungary,
assignors to Magyar Villamossagi Kulkereskedelmi
Vallalat, Budapest, Hungary
Filed Sept. 30, 1964, Ser. No. 400,483
6 Claims. (Cl. 340—248)

This invention relates to signalling or monitoring systems, particularly, for effecting remote indication of conditions in the system being monitored.

In the art of controlling electrical or other processes of flow, operations of transport, etc., exact knowledge of the position or condition of the switch elements, shut-off devices and changeover arrangements is of fundamental importance.

The present invention concerns an arrangement of an electrically operable indicating device by means of which the respective position of each of such control devices in a monitored system will be indicated to thereby permit a quick and reliable check of the status, position, or condition of the system which may be more or less widely spread. Such systems could include transmission systems such as electrical circuit installations, pipeline systems, railroads, etc.

In a system for the transmission of electric energy, it is customary to employ circuit breakers and disconnecting switches to control the system. The respective condition of the system can be clearly checked and controlled only when it is possible to ascertain and control the respective position of the said circuit breakers and switches, and any change in the position of these devices regardless of whether such change has been brought about deliberately or by some circuit failure. Generally, to this end, control and switchboards are employed which in addition to containing the necessary measuring and indicating instruments also diagrammatically show the entire installation with symbols for the control devices and the actuating elements therefor. By means of such diagrammatic representations, which may be made up in various manners (in colors and illuminated), it is possible to obtain a complete and reliable picture of the respective installation and its condition, only if in the respective diagrammatic illustration all control elements are shown in their respective two positions and if each positional change is immediately indicated. For purposes of realizing the last-mentioned condition, so-called position indicating means are provided as, for instance receipting and drive-receipting switches (Quittierungsschalter, Antriebsquittierungsschalter).

For purposes of visually indicating the position of switches and control devices, colored signalling lamps or signalling lamps with legends thereon, have been employed. This arrangement was then developed into a so-called lamp-box which visually indicates, for instance the control position, by illuminating a line strip correspondingly entered in the diagrammatic illustration of the respective installation. However, inasmuch as the requirement for an immediate indication of a change in the control position to be indicated to the operator became more and more general, there were developed condition indicating control means with handles arranged in the line of the diagrammatic representation. These condition indicating devices are such that when a change in position of the respective control member occurs, it becomes necessary for the operator to move the said handles into a corresponding position. Until this has been accomplished, the respective switch or control device will show a continuous or blinking-light or may emit a sound signal.

Position indicators of the above-mentioned type combined with light signals generally have the drawback that they require incandescent lamps. On one hand, such lamps consume a relatively considerable amount of current. On the other hand, there exists the danger that a burned-out lamp causes a blackout of the respective field instead of illuminating the same and preventing faulty operations. This drawback can be obviated by arranging additional lamps in parallel. Such an arrangement, however, increases the overall size of the control installation and also increases the current consumption. In view of the greater space requirement of the individual elements, also the area of the field of illustration becomes considerably larger.

Another simplified construction of the position indicator for control devices, as it is still widely used, consists of a magnetic apparatus in which the momentary position of the switch is indicated by a corresponding rotation of a colored disc. However, such magnetic position indicators are not suitable for solving all occurring problems. In addition thereto, they require considerable space and continuously consume a relatively large amount of current.

Consequently, a diagrammatic reproduction of the control installation will, due to the considerable space requirement for each installed condition indicator of any type assume considerable dimensions. Naturally, also the manipulation boards carrying the diagrammatic reproduction of the respective installation will be rather large and expensive and, due to their size, cannot easily be observed in their entirety at one time.

The possibility exists of obviating the above-mentioned drawbacks by providing low voltage operable devices, inasmuch as in such an instance, all components of the position indicators and other devices can be considerably smaller. Such constructions, however, do not easily find wide application because the operation of such devices is linked to specific conditions and the manufacture of such devices is relatively expensive. Moreover, considerable doubts exist with regard to their functional reliability.

When high voltage control devices for high or medium voltage have installed therein low voltage operable elements and auxiliary devices, these structural elements which are not usually encountered in energy transmitting systems, may present unusual problems to the maintenance and operating personnel, especially with regard to operation, service, maintenance and repair.

It is, therefore, an object of the present invention to provide an indicating arrangement for indicating the respective status of systems such as electric installations, especially power transmission systems, pipe systems, etc., which will overcome the above-mentioned drawbacks.

It is another object of the present invention to provide an indicating arrangement for indicating the respective status of various electric installations, in which power current operated insulations may be employed.

It is a still further object of the present invention to provide an indicating device as set forth in the preceding paragraph, which is characterized by compactness, a decreased current consumption and an increased reliability of operation.

A still further object of the present invention consists in the provision of an indicating device as set forth above in which the total size of the installation has been considerably reduced.

These and other objects and advantages of the invention will appear more clearly from the following specification in connection with the accompanying drawing in which:

FIG. 1 diagrammatically illustrates the basic arrangement according to the present invention for indicating the status or condition of an installation to be controlled.

Figure 2:
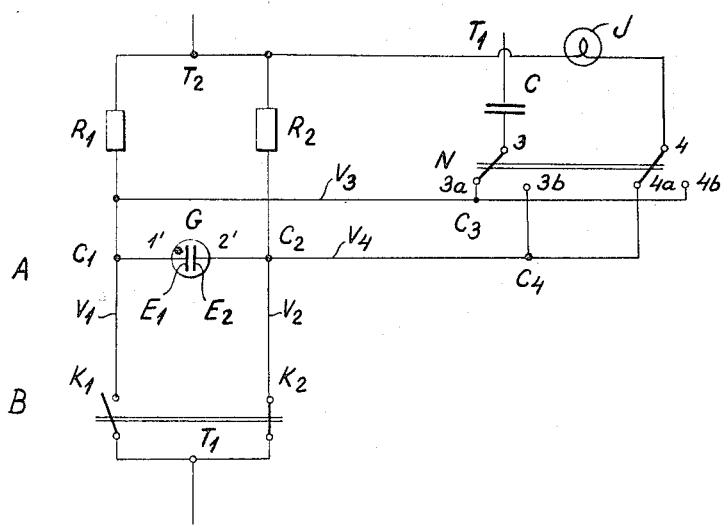
Figure 3:
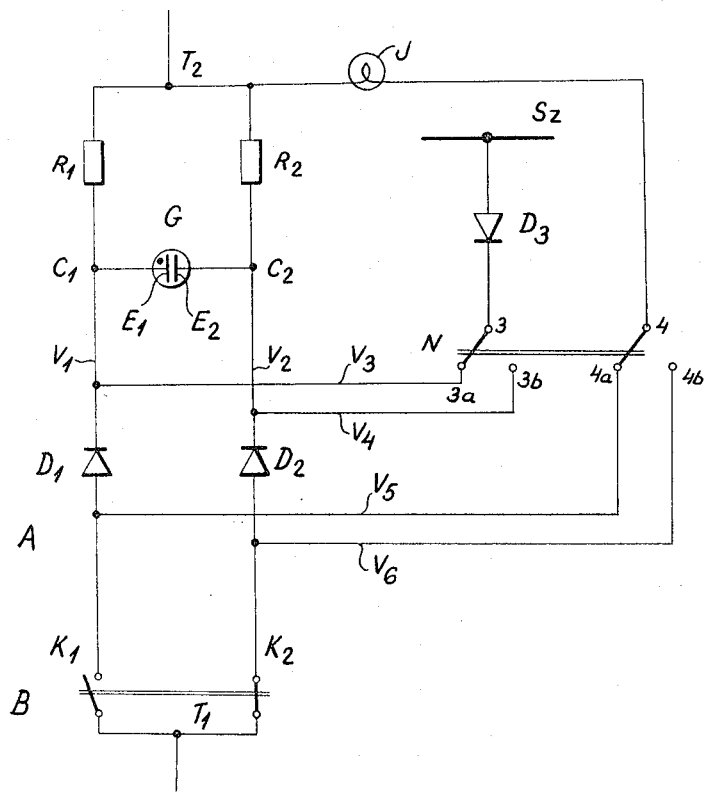

FIGS. 2 and 3 illustrate the combination of a device according to FIG. 1 with a drive control switch or a command control switch respectively.

The indicating arrangement according to the present invention is characterized primarily in that a direct current operated glow lamp is provided across the branches of a circuit having parallel branches. One end of the branches is interconnected and leads to one pole of a direct current source. Near the one ends of the branches there is arranged one impedance or resistor each. Switches are in the branches near the other ends thereof. The other ends of the branches are interconnected and lead to the other pole of the direct current source. The glow lamp has one electrode connected to each branch between the resistor therein and the switch therein. The switches are arranged to be actuated by the monitored device so that in each position of the device, a respective one of the switches is closed and the other is open. In this way, at least two different conditions of an installation to be controlled can be differentiated by light signals.

The resistors mentioned above are either of the same or of different size. In case the resistors are different from each other, also the repeating frequency is different and the two signals can be distinguished even better.

Referring now to the drawing in detail and FIG. 1 thereof in particular, the arrangement shown therein comprises a pair of parallel branches, the ends of which are connected to the terminals of a direct current source by means of the connecting points $T_1$ and $T_2$. Those ends of the branches which are located on that side which pertains to the connecting point $T_1$ are provided with two switches $K_1$ and $K_2$ one of which ($K_1$) being open and the other one ($K_2$) being closed. A glow lamp G arranged between junctions $C_1$ and $C_2$ is by means of a terminal $1'$ connected to the junction $C_1$ and by means of a terminal $2'$ to the junction $C_2$. Two ohmic resistors $R_1$ and $R_2$ are arranged in those ends of the branches which are located on the side of the connecting point $T_2$. The terminal of switch $K_2$ opposite connecting point $T_1$ and the junction $C_2$ are interconnected by means of a conductor $V_2$, while the terminal of switch $K_1$ opposite connecting point $T_1$ is connected to junction $C_1$ by conductor $V_1$.

The above-described circuit is adapted to signal by the glow lamp at area A the respective condition or status of an installation arranged in an area B of FIG. 1 by means of the arrangement described further below. When the switch $K_2$ is closed, an electric connection is established between the terminal $T_1$ and the terminal $T_2$ through the switch $K_2$, the conductor $V_2$, the junction $C_2$, the resistor $R_2$, the glow lamp G and the resistor $R_1$. Due to this connection a corresponding electrode of the glow lamp lights up and thereby indicates a certain position of the controlled installation or switch.

In case the just mentioned installation is in another condition or position, the position of the switches change correspondingly. The switch $K_1$ is closed and the switch $K_2$ is opened. Thus, a connection is established between the terminals $T_1$ and $T_2$ through the switch $K_1$, the conductor $V_1$, the junction $C_1$, the resistor $R_1$, the glow lamp G and the resistor $R_2$. In view of this connection, the other electrode of the glow lamp lights up and thus indicates that the installation or arrangement occupies a position different from that position in which the first-mentioned electrode lights up.

According to a further feature of the present invention, a condenser is added to the arrangement shown in FIG. 1. If such a condenser, or a current source with a periodically varying voltage, is connected to one or the other pole of the glow lamp through the intervention of one or more switch elements in such a way that the other pole is connected to the feeding point of that branch of the bridge which is without any resistor, an arrangement is obtained by means of which four different conditions can be indicated by light signals. The periodically varying current source yields the advantage that it is possible to connect thereto simultaneously a plurality of indicating means, however, with the following limitation, namely that a rectifier has to be inserted between the switch member and the alternating current source.

The just mentioned arrangement is particularly suitable for signalling various conditions and statuses to a distant location. For this purpose, a two-pole receipting switch is employed. A signalling lamp is connected to one pole of said receipting switch while said lamp is furthermore alternately connected to one of the contact points located between the one or the other of the rectifiers arranged in the resistor-free ends of the branches of the circuit and the corresponding contact, whereas the other pole of the signalling lamp is connected to a feeding point in the ends of the branches which are provided with a resistor.

One or more of the electrodes arranged in the glow lamp for indicating the position of a switching member is or are always in a glowing condition (either permanently or intermittently) depending on the respective position of the switching member. The above mentioned electrodes are designed in conformity with the respective requirements and are arranged in a line or path of the diagrammatic illustration of the invention. In view of the above arrangement, the actual condition of the switching member is indicated and the personnel checking the installation can easily perform the necessary steps, and the result of the steps taken by the personnel can easily and directly be controlled.

The essence of the present invention is not affected, when in conformity with the above mentioned further feature, additional structural elements are provided in the present arrangement so that further conditions of the installation to be controlled may be indicated. Such combinations are shown in FIGS. 2 and 3.

Referring first to the arrangement shown in FIG. 2, the indicating device of FIG. 1 has been combined with a condenser one plate of which is connected to one of the junctions $C_1$ or $C_2$ of the circuit described in connection with FIG. 1, while the other plate of said condenser is connected to the feeding point or terminal $T_1$ of the same system. The actual circuit is the same as described in connection with FIG. 1. However, it differs therefrom in that a conductor $V_3$ is connected to the junction $C_1$ and a conductor $V_4$ is connected to the other junction $C_2$. Furthermore, junctions $3a$ and $4b$ are connected to the junction $C_3$ of the conductor $V_3$. One of said junctions $3a$ and $4b$ is connected to the terminal 3 or 4 of a control receipting switch N while the other one of said junctions is connected to the junction $C_4$ in conductor $V_4$. One of the plates of the condenser C is connected to the terminal 3 of the switch N whereas the other plate of the condenser C is connected to the terminal $T_1$. Finally, one pole of a signalling lamp J is connected to the terminal 4 of the receipting switch whereas the other pole of the said signalling lamp J is connected to the terminal $T_2$.

The arrangement according to FIG. 2 is adapted to indicate four different positions of an installation by means of a two-electrode glow lamp. These four different positions or conditions may be four different positions of one and the same installation or they may be two different positions each of two independent installations. Further, switch N may be the remote control element for the device which actuates switches $K_1$ and $K_2$. If the arrangement according to the present invention is supplemented by the additional control receipting switch N and the contacting points 4, $4a$ and $4b$ thereof and furthermore by the signalling lamp J, the arrangement is also adapted to indicate at a distant location where the signalling lamp J is located at the relative positions of the control receipting switch N and the switches $K_1$ and $K_2$ or the changes thereof.

As has already been described in connection with FIG. 1, the glowing of one of the electrodes of the glow lamp G and thereby the function of the arrangement depends on the closed or opened position of the switches $K_1$ and $K_2$. If the control position, i.e., the relative position of the switches $K_1$ and $K_2$ with regard to switch N, is in conformity with the position shown in FIG. 1, a closed circuit is established comprising the condenser C, the contacts 3 and 3a of the switch N, the junction $C_1$, the terminals 1' and 2' and furthermore the glow lamp G, the junction $C_2$, the conductor $V_2$ and the switch $K_2$, i.e. the condenser C and the glow lamp G are in parallel. In this way, the glow lamp G and the condenser C arranged in parallel thereto are in series with the resistor $R_1$ between the terminals $T_1$ and $T_2$.

After the arrangement has been put into operation, the charging of the condenser C commences through the resistor $R_1$. When the condenser voltage reaches the threshold value necessary for the ignition of the glow lamp, the effected ignition brings about a discharge between the electrodes $E_1$ and $E_2$ which continues until the condenser voltage is reduced to the value at which the glow lamp is extinguished. At this moment, the charging of the condenser is again initiated. This continuous cycling brings about that one electrode of the glow lamp glows intermittently or blinks. Therefore, if either the position of the switches $K_1$ and $K_2$ or the position of the terminals of the switch N is changed, the parallel arrangement of the glow lamp G and the condenser C is suddenly interrupted, the blinking of the glow lamp will stop and one electrode thereof will commence to glow continuously.

As will be evident from the above, the four different control positions of the installation will be indicated by four different control signals, namely by continuous or intermittent glowing of one or the other of the electrodes of the glow lamp.

Referring now to FIG. 3, the indicating device shown therein is similar to that of FIG. 1. However, the arrangement of FIG. 1 has been provided with rectifiers, or diodes, $D_1$ and $D_2$ arranged in the conductors $V_1$ and $V_2$. Also in this instance, the conductor $V_4$ is connected to the junction $C_2$ while the other end of the conductors are connected one after another to the terminals 3a and 3b. Terminal 3 of the switch N is connected to a conductor S of an alternating current system through the rectifier $D_3$. The relative voltage of the conductor S with regard to the feeding point $T_1$ of the circuit varies periodically. A conductor $V_5$ is connected to that side of the rectifier $D_1$ which is opposite the junction $C_1$, whereas a conductor $V_6$ is connected to that side of the rectifier $D_2$ which is opposite the junction $C_2$. The other end of conductor $V_5$ is connected to the terminal 4a of the switch N, and the other end if conductor $V_6$ is connected to the terminal 4b. Furthermore, the terminal 4 of switch N is connected to one terminal of the signalling lamp J whereas the other terminal is connected to the feeding point or terminal $T_2$.

The operation of the arrangement according to FIG. 3 is the same as that described in connection with FIG. 2. However, there exists the following differences in the construction of the arrangement. In this instance, the blinking of the electrodes $E_1$ and $E_2$ of the glow lamp G is not effected by the parallel arrangement of a condenser C but by differences in voltage periodically produced with regard to the bridging point. The insertion of rectifiers $D_1$ and $D_2$ becomes necessary only if it is intended to have the signalling lamp J actuated also by the conductors $V_5$ and $V_6$. Furthermore, the rectifier $D_3$ is only required if more than one indicating device is connected to the conductor $S_2$, in which case the indicating devices are connected to the arrangement as in the case with the one indicating device described in connecting with FIG. 3.

The switching arrangements connected to the arrangement according to the present invention may in all instances be of the mechanical, pneumatic, hydraulic, electric or electronic type. It is, however, advisable to employ a transistor or a cold or hot operated electronic cathode tube for such a switching arrangement.

The glow lamps employed in the arrangement according to the present invention may be mass produced. The current consumption and the heat formation are relatively small so that all the drawbacks encountered with heretofore used incandescent lamps in view of the high current consumption and the intensive heat formation are eliminated. Furthermore, glow lamps are not easily damaged and have a considerably longer life than incandescent lamps. In view of the particular switch arrangement according to the present invention and the high degree of reliability of the glow lamps, it is a virtually certain indication of a fault in the monitored system when the glow lamp is dark. In this way, failures may be eliminated without any delay.

There exists various possibilities for the design of the circuit arrangement according to the present invention for indicating the condition or status of an installation. In this way, the invention is very advantageous for electric circuits as well as for any other system which may be diagrammatically represented, as for instance pipe systems, transporting paths, railroads, etc. The electric circuit arrangement according to the present invention may be adopted in a variety of ways to practical and reliable circuits for receipting or commanding signals.

In order to show how it is possible to considerably reduce the size of the installation or to considerably reduce the space required for the diagrammatic illustration and representation of the installation, the following example may be given. With heretofore known designs of a power current arrangements for a rail system having twenty branches, the space requirement for the control panel amount to 10 to 15 square meters when employing indicating systems.

In order to assure a reliable checking of the control panel, a floor area of 30 to 40 square meters is required. In contrast thereto, when designing the control panel in conformity with the present invention, an area of approximately 2 square meters is required. In order to assure a quick and reliable checking of the control panel, at the most a floor area of approximately 6 square meters is required.

It will be evident from the above that, with regard to the space requirements, the arrangement according to the present invention surpasses by far the heretofore known control arrangements. The cost of building the electrotechnical indicating arrangement proper amounts to only a fraction of the cost required for building an indicating installation of heretofore known design.

It is, of course, to be understood that the present invention is, by no means, limited to the particular constructions shown in the drawing but also comprises any modifications within the scope of the appended claims.

What is claimed is:

1. An indicating apparatus for indicating the position of a two-position device remote from the apparatus, said apparatus comprising an electric circuit having a pair of parallel branches, each branch extending from the apparatus to said device and each having a high impedance therein at the apparatus end, a switch blade in each branch at the device end thereof, said switch blades being connected to move together and so that when one closes the other opens and vice versa and being adapted for actuation by said device so that in one position of said device one of said switch blades is closed while in the other position of said device the other of said switch blades is closed, a gas discharge tube at the apparatus end of said branches having two electrodes, one electrode being connected to each branch between the impedance and switch blade thereof, the respective ends of said branches being connected together, and a source of direct current supply at a voltage sufficient to fire said tube and having its opposite sides connected to the respective interconnected ends of said branches, whereby one or the other electrode of said tube will glow depending on which one of said switch blades is closed and the tube thus serving as an indicator to indicate the respective position of said device.

2. An apparatus according to claim 1 which includes a condenser, one side of said condenser being connected to the side of the direct current supply line which is connected to the switch blade end of said branches, a further switch blade connected to the other side of said condenser, a pair of terminals with which said further switch blade is selectively engageable, each of said terminals being connected to a respective one of said electrodes whereby in one position of said further switch blade said tube will blink on and off whereas in the other position of said further switch blade said tube will glow steadily.

3. An apparatus according to claim 2 which includes an indicating lamp, one side of said indicating lamp being connected to the side of said direct current supply line which is connected to the high impedance ends of said branches, a second further switch blade connected to the other side of said lamp, a further pair of terminals connected to respective ones of said electrodes, said second further switch blade being connected to move with the first mentioned further switch blade so as to close on the respective one of said further pair of terminals which is connected to the opposite one of said electrodes from the electrode connected to the terminal on which the first mentioned further switch blades closes in a respective position whereby in that position of said further switch blade in which said tube blinks said lamp will be energized whereas in the other position of said further switch blade said lamp will be deenergized.

4. An apparatus according to claim 1 which includes a further switch blade, a pair of terminals with which said further switch blade is selectively engageable, each of said terminals being connected to a respective one of said electrodes and a source of pulsating voltage connected to said further switch blade whereby in one position of said further switch blade said tube will blink on and off whereas in the other position of said further switch blade said tube will glow steadily.

5. An apparatus according to claim 4 which includes a condenser, one side of said condenser being connected to the side of the direct current supply line which is connected to the switch blade end of said branches, a further switch blade connected to the other side of said condenser, a pair of terminals with which said further switch blade is selectively engageable, each of said terminals being connected to a respective one of said electrodes whereby in one position of said further switch blade said tube will blink on and off whereas in the other position of said further switch blade said tube will glow steadily.

6. An apparatus according to claim 5 which includes diodes in series with the switch blades in said branches and with said further switch blade and all poled in the same direction with respect to said electrodes.

References Cited

UNITED STATES PATENTS

| | | |
|---|---|---|
| 1,762,712 | 6/1930 | Charlton. |
| 2,298,956 | 10/1942 | Mason. |
| 2,574,374 | 11/1951 | Bivens. |
| 2,819,400 | 1/1958 | Toth _____ 340—253 XR |
| 3,056,124 | 9/1962 | Young. |

JOHN W. CALDWELL, *Primary Examiner.*

THOMAS B. HABECKER, *Examiner.*

D. MYER, *Assistant Examiner.*